US008138886B1

(12) United States Patent
Chang

(10) Patent No.: US 8,138,886 B1
(45) Date of Patent: Mar. 20, 2012

(54) COMMUNICATION ENABLED ACTIVE LOCK SYSTEM

(75) Inventor: Ifay F. Chang, Somers, NY (US)

(73) Assignee: Ifay F. Chang, Katonah, NY (US)

( * ) Notice: Subject to any disclaimer, the term of this patent is extended or adjusted under 35 U.S.C. 154(b) by 934 days.

(21) Appl. No.: 12/124,401

(22) Filed: May 21, 2008

(51) Int. Cl.
*B60R 25/00* (2006.01)
*G05B 19/00* (2006.01)
*E05B 65/48* (2006.01)

(52) U.S. Cl. .................... 340/5.73; 340/5.22; 340/5.28; 340/5.32; 70/3

(58) Field of Classification Search ................ 340/5.73, 340/5.22, 5.28, 5.32; 70/3, 1.7, 21, 22, 256–257
See application file for complete search history.

(56) References Cited

U.S. PATENT DOCUMENTS 6,337,618 B1 * 1/2002 Craig et al. ................. 340/5.22
7,130,401 B2 * 10/2006 Rampey et al. .......... 379/142.14
7,606,558 B2 * 10/2009 Despain et al. .............. 455/410
2006/0236407 A1 * 10/2006 Mergenthaler ................. 726/28
2007/0096870 A1 * 5/2007 Fisher ......................... 340/5.53

* cited by examiner

*Primary Examiner* — Benjamin C Lee
*Assistant Examiner* — Omeed Alizada

(57) ABSTRACT

An active lock system includes wireless communication capability and information display and processing functions providing convenience, security and privacy protect usable as a secured lock and/or as a lock box for storing a key or code, permitting access to a locked premise. The lock system consists of a keyless lock device with a coded input control for locking and unlocking itself, a compartment for storing objects, a wireless communication device for receiving cell phone calls and performing identity verification, an information processing and display device for capturing, storing and displaying data, instructions, images, graphics, messages, advertisements and system operational information, and a handle for attaching the lock system to a property it protects and controls access. The communication device operates under cell phone communication standards and decodes dial tone signals whereas the information display offers data interaction, procedural instructions and ads. The system can be powered by a solar pane.

15 Claims, 3 Drawing Sheets

Fig. 1. The Active Lock Box System (10)
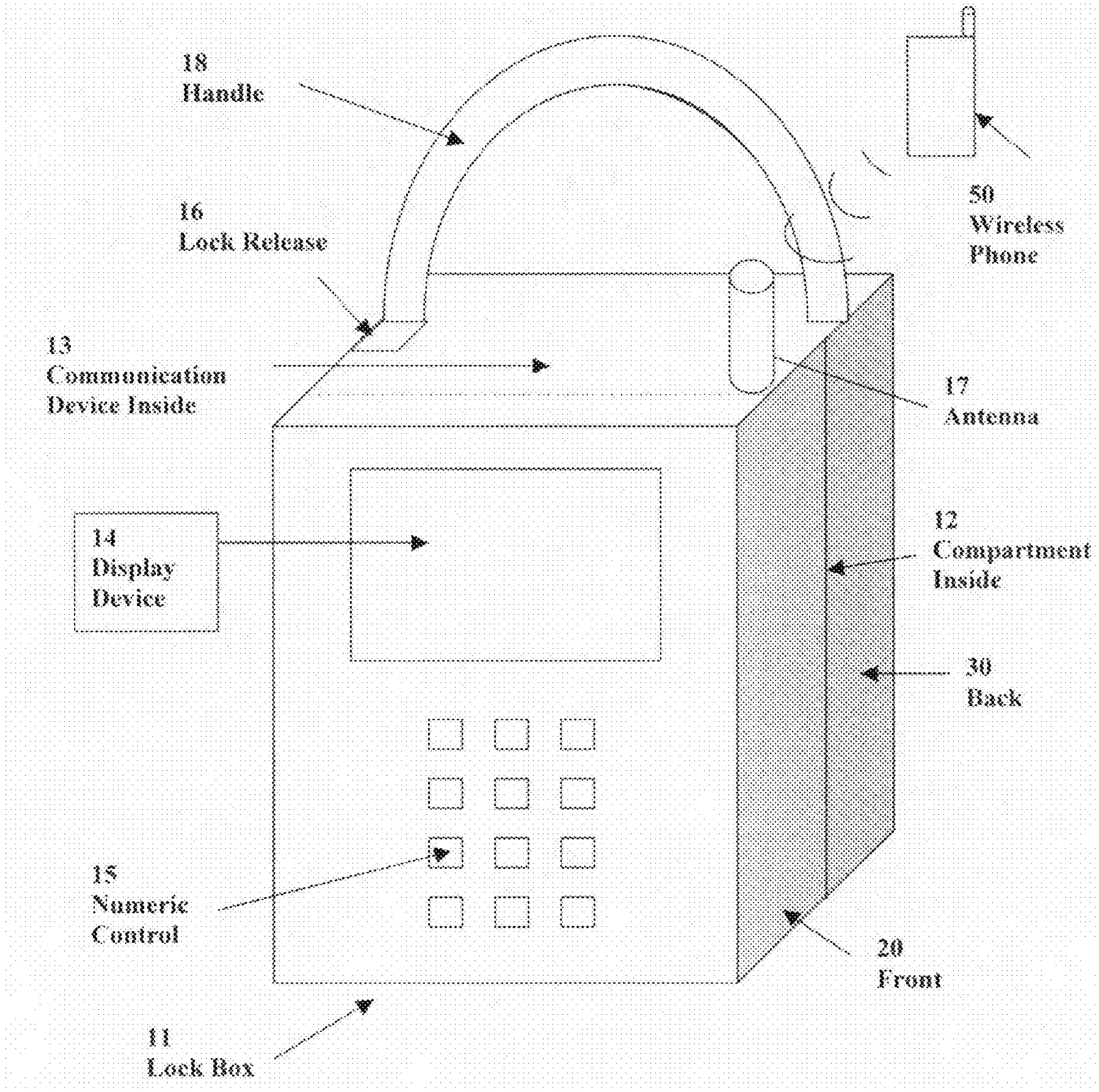
Fig. 1 The Active Lock System (10)

Fig. 2 Schematic and Functional Diagram of the Active Lock Box
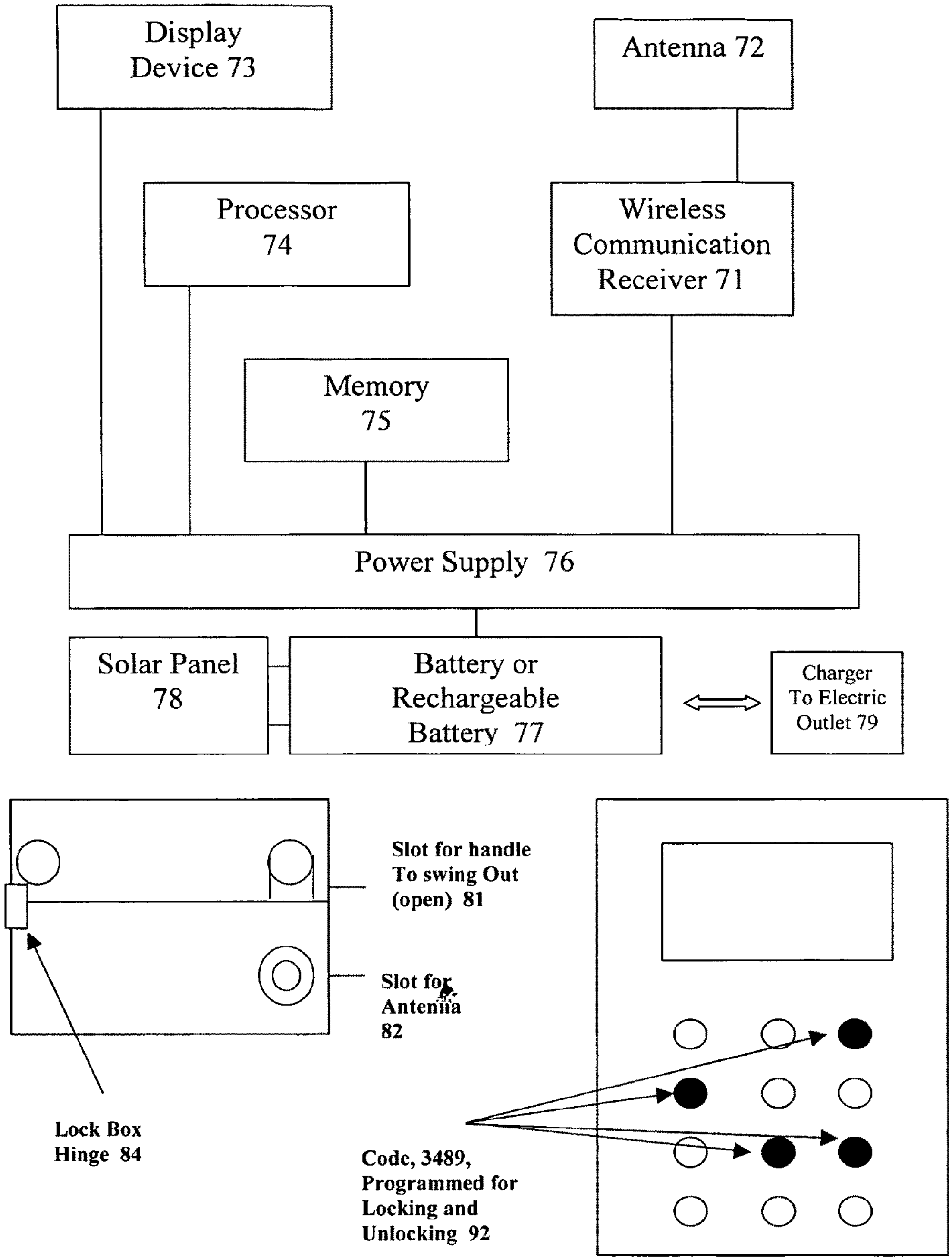

Figure 3:
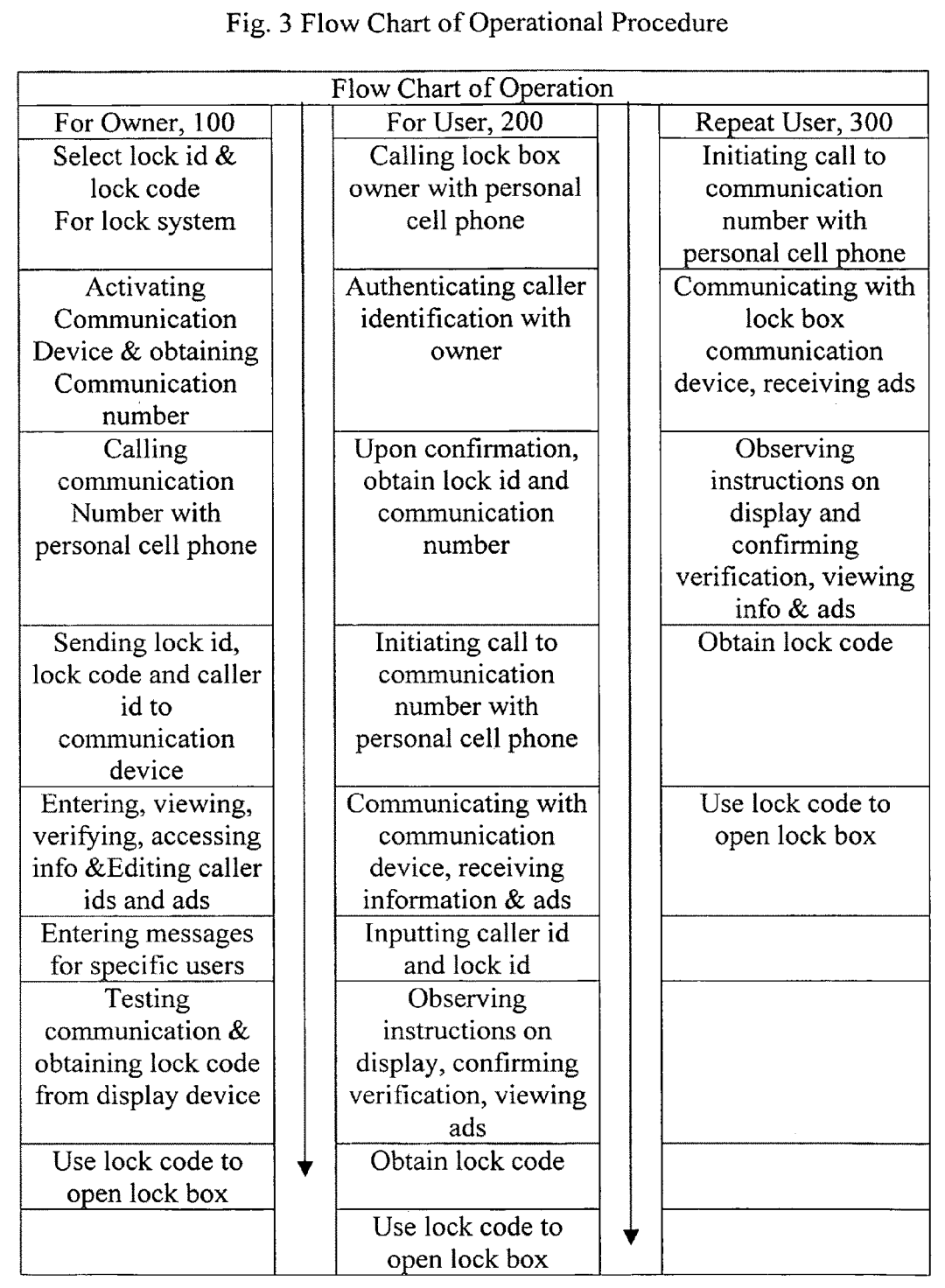

Fig. 3 Flow Chart of Operational Procedure

| Flow Chart of Operation | | |
|---|---|---|
| For Owner, 100 | For User, 200 | Repeat User, 300 |
| Select lock id & lock code For lock system | Calling lock box owner with personal cell phone | Initiating call to communication number with personal cell phone |
| Activating Communication Device & obtaining Communication number | Authenticating caller identification with owner | Communicating with lock box communication device, receiving ads |
| Calling communication Number with personal cell phone | Upon confirmation, obtain lock id and communication number | Observing instructions on display and confirming verification, viewing info & ads |
| Sending lock id, lock code and caller id to communication device | Initiating call to communication number with personal cell phone | Obtain lock code |
| Entering, viewing, verifying, accessing info &Editing caller ids and ads | Communicating with communication device, receiving information & ads | Use lock code to open lock box |
| Entering messages for specific users | Inputting caller id and lock id | |
| Testing communication & obtaining lock code from display device | Observing instructions on display, confirming verification, viewing ads | |
| Use lock code to open lock box | Obtain lock code | |
| | Use lock code to open lock box | |

COMMUNICATION ENABLED ACTIVE LOCK SYSTEM

BACKGROUND OF THE INVENTION

1. Field of Invention

The present invention relates to an active lock system with methods to authenticate users and provide guidance to operate the lock with security and privacy protection. The active lock is communication enabled using wireless communication technology responding to wireless phone calls to perform user identification verification and convenient and secure operation of the lock.

2. Description of the Art

In a society that security and privacy are important elements of life, people need locks for protecting their properties. Hence, numerous inventions on secured locks have been advanced ranging from mechanic locks, for example, bolt lock and double lock, to electronic locks, based on input device and electronic circuit to control the lock mechanism and to remote-control locks involving transmitter and receivers using coded signal such as those used in the car industry and security industry. Given the world is already equipped with various secured locks, mechanical, electronic and electromagnetic programmable locks; a simple and inexpensive system, based on the double lock concept is a desirable way to add security and privacy protection to a locked property and offer convenient but secure access control to such locked properties by keeping the key or code to the locked property locked up by another lock. This practice has been used in the real estate industry known as a “lock box”. The lock box usually contains a ‘key’ or ‘code’ to the already existing secured lock system but the lock box itself is controlled by another ‘key’ using conventional mechanical locks or controlled by a ‘code’ using resettable keyless locks, such as push button pins, keypads, rotating dials and the like.

This double lock concept protects the integrity of the original permanent lock system by avoiding duplications of many keys to the original lock. An inexpensive and portable lock may be used to provide an access to the key of the original lock system for permitted personnel. However, an operational deficiency of the system often causes inconvenience and security compromise. For example, in the real estate industry, many keys have to be made for a lock box placed on a house for sale since these lock box keys have to be distributed to many real estate agents to allow them to show the house to their clients at different times. This practice definitely causes inconvenience. Any agent wishes to show several houses needs to visit the listing realtor’s office to get a key for each lock box placed on each house the agent’s clients may be interested in. There are potential security problems with too many keys circulating. A more sophisticated lock box uses a keyless lock system, but it still requires an agent to either go to the office to obtain the code before visiting a house or to call the office when the agent is at the house to obtain the code to open the lock box. The latter scenario presents a security exposure since one can not verify who is at the lock box (house) requesting the code. Requiring all agents to visit the office to get the codes for lock boxes not only causes tremendous inconvenience to the agents but also requires a person sitting at the office seven days a week to respond to the code requests by hundreds of agents for hundreds of houses listed with the office. The face-to-face verification of agent identification is also time consuming. Therefore, it is very desirable to introduce an automated system to manage the lock boxes and to access the locked properties.

This invention relates to an active lock system and its secure operating procedures having remote control capability via wireless communication. A wireless phone receiver and an information display and processing unit are integrated with a conventional keyless lock to provide the necessary functions of communication, information entry, identification verification and automated management of access control in an unique way. Operational methods of the active lock system not only provides security and privacy protection but also offers convenience to owners and users in terms of setup, operation and management of the system. The active lock system can be used as a double lock such as in the real estate application as a lock box as well as a single lock for other applications such as for protecting truck containers, warehouse and storage facilities. The lock mechanism itself in this lock system can be flexibly selected according to the applications desired. The skilled in the design and manufacture of locks can apply the present invention to any existing keyless lock.

SUMMARY OF THE INVENTION

The objective of the present invention is to provide a communication enabled lock system that not only fulfills the requirements of a “lock box” or a “lock” application with procedural automation and enhanced functions but also offers more security and privacy protection as a lock system for general property protection.

The lock system comprises of a keyless lock device having a numeric code control for unlocking the lock box or the lock, in the case of a lock box, a compartment for storing objects; a wireless communication receiver with an antenna compliant with cell phone protocols such as G1, G2, G2.5, G3, G3.5, G4 and similar conventions capable of receiving wireless communication; and an alphanumeric and graphical display and information processing unit with a display surface capable of displaying messages, instruction and advertisements. The display device and the communication device share a common processor and a digital memory all powered by a battery. Optionally, the battery is a rechargeable one connected to a solar cell panel mounted on one side of the lock system or to an external battery charger via a connector. The active lock system is loaded with an operating software in a read only memory which supports the information processing unit for functions of capturing of caller-ids, registering time when the lock system is opened or used and transmitting the data to the owner when requested during a communication session. The active lock system performs at least one or more of the following functions: 1. locking and unlocking the lock system. 2. storing an object such as a key to another secure lock. 3. receiving wireless communication. 4. capturing and storing data in memory for access by the owner and user of the lock system. 5. displaying information to callers to the lock system and 6. providing energy to operate the active lock system. The method to operate the lock system by an owner comprises of at least one or more of the following steps: (i) entering lock id, lock box code, user identification and/or cell phone number. (ii) interacting with displayed messages such as instructions, lock code and/or advertisement and/or responding with inputs. (iii) accessing information stored in the lock system such as who and when a user made access to the lock system. (iv) opening lock with code. (v) storing an object such as a key to another lock system. (vi) closing the lock system. The method to operate the lock system by a user comprises of at least one or more of the following steps: (i) obtaining the id number of the communication device, (ii) calling the communication number from a personal cell phone, (iii) the lock communication device receiving call, storing caller identification number, registering time of call, and displaying messages. (iv) caller responding to a message or messages such as instruction, lock code and/or advertisements. (v) confirming response by user and providing instruction to continue and (vi) opening the lock.

Depending on the applications the lock system is used for, the procedures of the operational method can be altered or modified in sequence to provide more security or more efficiency.

BRIEF DESCRIPTION OF THE DRAWINGS

FIG. 1 illustrates the system and operational scheme of the multi-function remote control lock system with communication means FIG. 2 is a schematic diagram describing the components of the lock system FIG. 3 is an exemplary flow chart illustrating how owners and users operate the secure lock system

DETAILED DESCRIPTION OF THE INVENTION

This invention provides a secure lock box system taking advantages of existing various lock mechanisms, the conventional mechanical lock mechanisms and the modern wireless communication, information processing and display technologies to serve many industries including real estate such as lock box, transportation such as truck door lock, banking such as cash dispenser, warehousing such as storage lock for locking and storing objects with operational convenience yet with full protection of security and privacy.

As shown in FIG. 1, the lock system, 10, consists of a strong and secure box, 11, typically made of metal which contains a compartment, 12, for storing an object such as another key set or key pad for operating a separate lock. The compartment, 12, is sandwiched between the front, 20 and the back, 30 of the box, 11. The front part, 20, of the box, 11, contains a communication device, 13, a display device including a processor and read only and refreshable memory components, 14 and a numerically coded input control device, 15. The input control device, 15, is placed in proximity of the lock release mechanism, 16, such as a spring release or solenoid release for unlocking the box. An antenna, 17, for wireless communication is housed close to the communication device oriented to facilitate easy handling and to avoid orthogonal protrusion. The box handle, 18, can simply swing open when the lock release is opened. The handle is securely locked in place when the box is locked. The handle allows the box to be used a secure lock, for example, it can be securely hung over a doorknob only removable when the box is open.

FIG. 2 further illustrates the lock system from a functional and schematic point of views in the upper and lower parts of the figure. The lock device as shown in FIG. 1 is a conventional keyless lock with the lock handle, 18, placed on either the back half, 30, or front half, 20, of the lock box. The lock handle is securely hinged on one end controlled by the release mechanism such as a spring or a solenoid controlled pin as in many conventional keyless locks. The other end of the handle can be freely swung in and out of a slot when the lock mechanism is released as shown schematically in the left lower portion of FIG. 2. As shown in the upper portion of FIG. 2, the display device, 73, the process, 74, the memory containing both read only and refreshable components, 75, the communication receiver, 71, the antenna, 72, the power supply, 76, the battery, 77, and the solar energy device, 78 are interconnected modules securely placed in the interior of the front half of the lock box. In operation, the numeric input for controlling the lock box is facing the user whereas when not in operation the lock box is turned backward so that the solar cell panel on the back panel is facing front to absorb solar energy. As shown in FIG. 2, an outlet connector is provided as an alternative for charging the battery and the power supply. Not shown in FIG. 2, is an optional data output connection permitting the owner of the lock system to print out the data stored in the lock system memory if needed. As an example shown in the lower right portion of FIG. 2, the lock code, 92, can be programmed with a keyless control pad.

FIG. 3, is a flow chart detailing the operation of the lock system by an owner, 100, and a user, 200 and a repeat user, 300. With the descriptions in FIG. 1 and FIG. 2 above, the schematic in FIG. 3 can be illustrated with some exemplary scenarios of operation to show how the lock system works for an owner, 100, a user, 200, and a repeat user, 300, as given below.

A owner, 100, of a lock system desires to place the lock system over a property to protect the property. The property may have an existing lock with a key. Then the owner selects a lock system and uses it to store the key to the existing lock. The owner will first program a lock code, for the keyless lock such as selecting a numeric key code as in common practice with many keyless locks such as one manufactured by Schlage, Kaba Ilco, Trilogy and the like. The owner then shall open the lock system and store a key in the compartment. Next the owner activates the communication device with a switch located from the inside of the lock box turning the communication receiver on. Optionally the owner switches on the solar energy panel if the back panel of the lock box contains a solar panel. Now the lock box is ready for use and testing. The owner hangs the lock box handle on premise such as the front door of a house. Then the owner tests the lock box with a cell phone by dialing the communication number of the lock system. The owner observes the lock system responding to the call and reads messages shown on the display screen. The messages are intended for: (1) requesting the owner to assign or enter an lock id and confirm a lock code for the lock system using a series of dial tones generated by the dial keys on the owner's cell phone. (2) entering known users' identification such as license number or personal cell phone number in dial tones which the communication device will store in its memory with the owner's id being designated as super user who can reassign lock-ids, lock code and caller ids. (3) requesting caller to enter cell phone number or caller id for verification of the calling owner before displaying lock box code to the calling owner. The owner responds to the messages and wait for the code to be displayed. The caller then uses the code to open the lock system. When the lock system is open, it indicates that the test is successful.

As a user, 200, he or she will first call the lock system owner or the business office that manages lock systems to obtain the communication number and the id of a particular lock system the user intends to open. The owner or office authenticates the user's identification such as by license number or personal cell phone number which can be verified or by using a video phone when the caller is using a camera phone. Upon verification, the owner or the officer then gives the lock system communication number and lock id to the user. The user then can operate the lock system by dialing the communication number from the user's cell phone and gives the correct lock id during communication. By assigning a lock id to a lock box, it is possible to use a common communication number for several lock systems. Of course, for ultra security purposes, a separate communication number for a separate lock system will provide additional security protection. Upon confirmation, the user reads the messages on the lock system display screen to obtain the keyless lock code, instructions for opening the lock system and any advertisement such as another property for sale nearby. Then the user can use the lock code to open the keyless lock.

For repeat users, 300, who already knew the lock id and the lock communication number, he or she simply can call the lock system and establish communication to get the instruction, any advertisement and lock code to open the lock system as shown in FIG. 3.

The above descriptions are merely for illustrating exemplary operations of the lock system presented. For those skilled in the art, the present invention can be recognized as applicable in many applications and as many varied scenarios.

The invention claimed is:

1. A method for operating a lock system comprising the following steps:

assigning a lock id and lock code to said lock system by an owner who places said lock system on a premise to control access to said premise;

activating a wireless communication device housed in said lock system via a switch; calling said communication device by dialing a communication number via a personal cell phone by the owner;

using said personal cell phone and its communication protocol and dial tone generation to enter said lock id, said lock code and expected and specific caller identifications into a memory shared by said wireless communication device and a display device and to program and activate an interactive program in said lock system for verifying lock id, lock code and caller identifications while at the location of said lock box;

entering, viewing, verifying and editing information to said lock through the operation of said interactive program;

wherein said information comprising of said lock id, said lock code, said caller identifications, instructions, messages and ads entered by the owner are stored in said memory shared by said communication device and said display device;

entering instructions and messages intended for specific users of said lock system, wanting in a user mode to gain access to said premise at a specific time;

testing communication with said communication device and said display device by calling via said personal cell phone, observing on said display device, verifying and obtaining said information that is displayed responsive to said calling at said location of said lock system;

wherein said testing and said information as lock code is displayed on the display device housed in said lock system can be extended beyond testing time rendering the procedure as the user mode; and opening said lock system using said lock code.

2. The method for operating said lock system in claim 1;

wherein said lock id and said lock code are represented by two series of alphanumeric code, represented, generated and transmitted by dial tone signals via said personal cell phone, recognized and processed by said interactive program in said lock system and stored in said memory;

wherein said caller-ids are represented by callers' cell phone numbers, generated and transmitted by dial tone signals via said personal cell phone, and recognized and processed by said interactive program in said lock system and stored in said memory; and wherein said caller-ids are alternatively represented by callers' driver license numbers, generated and transmitted by dial tone signals via said personal cell phone, and recognized and processed by said interactive program in said lock system and stored in said memory.

3. The method for operating said lock system in claim 1;

wherein said cell phone calling comprises of a call made by the owner of said lock system;

wherein said lock id and said lock code are codes dynamically selected and entered by said owner via a cell phone call are for a specific expected user who has requested and been granted a specific approval of a specific access to said premise during a specific period of time;

wherein said caller-ids are entered by said owner of said lock system by using dial tone signals generated by a cell phone call and are automatically registered and stored by said communication device for caller verification purposes;

wherein said one of said caller-ids belonging to said owner is designated as a super user id which allows said owner to activate and deactivate, to alter said interactive program and to process said information in a speedy and expedient procedure.

4. A method for operating a lock system comprising the following steps:

a caller calling the owner of said lock system to request access to a premise during a certain period of time by obtaining a lock id of said lock system and a communication number for a communication device housed in said lock system;

authenticating with said owner the caller identification of said caller; upon caller identification confirmation, obtaining from said owner said lock id of said lock system and said communication number of said communication device housed in said lock system;

said caller initiating a cell phone call to said communication number having said caller identification of said caller to establish wireless communication with said lock system at the premise where said lock system is placed and at the time approved for access by said authenticating;

communicating with said lock system through said cell phone and interacting with said lock system via an interactive program residing in an information processing unit of said lock system by following instructions displayed on a display device;

inputting said caller identification and said lock id to said lock system via said cell phone;

wherein said caller identification comprises a legitimate id such as caller's cell phone number and driver license number;

upon verification of said inputting personal caller identification and said lock id, said caller observing said display device and following instructions to obtain the lock code presented by said lock system;

wherein said lock code is displayed on the display screen of said display device; and said caller using said lock code to unlock said lock system.

5. The method for operating said lock system in claim 4;

wherein said caller is a user who wishes to communicate with the owner of said lock system to obtain said lock id and said lock code of said lock system to gain access to said premise during said approved period of time by opening said lock system;

wherein said lock id and said lock code are selected by said owner for said caller;

wherein said lock id and said lock code are alphanumerical codes entered and represented, generated and transmitted by dial tone signals via said caller's personal cell phone;

wherein said caller's id is represented by said legitimate id of said caller, received by said owner, who transmitted said caller id via dial tone signals of said owner's cell phone, and recognized and processed by said interactive program of said lock system and stored in said memory for user verification purpose; and wherein said caller is observing said display device and completing identification confirmation and lock id verification with said lock system at the said premis.

6. The method for operating said lock system in claim 4;

wherein said caller is a repeat user, who had previously communicated with the owner of said lock system and had obtained the lock id and the communication number of said lock system, wishing to gain access to said premise again;

wherein said repeat user can omit communication with the owner of said lock system and communicates directly with said lock system to verify said caller's previous approved access in order to obtain a new lock code assigned by said owner specifically for such repeat users;

wherein said repeat user's caller id must be said caller's said legitimate id which had been previously registered and stored in the communication device of said lock system for verifying said repeat user's identification; and wherein said repeat user's direct communication with said lock system involves responding to said interactive program to verify said repeat user's previous approved access.

7. The method in claim 4

Wherein said communication number can be shared by multiple units of said lock systems when the number is subscribed to a multiple phone service plan offered by a carrier.

8. A communicative lock system in a box form for property protection that performs the method as in claim 1 or claim 4, the system comprising:

a keyless lock device having a programmable alphanumerically coded input control for locking and unlocking of a box with a compartment for storing objects; a communication device having a wireless communication cell phone receiver with an antenna functionally compliant with cell phone communication protocols and capable of receiving and decoding cell phone calls and dial tone signals;

a processor capable of being programmed to process said dial tone signals into digital data and store said processed digital data and said received cell phone calls in a memory;

a display device having an information processing unit and an interactive program capable of interactively processing and displaying said digital data and said voice signal from said memory as well as camera images, messages and graphics; a rechargeable battery circuit; and a box housing said keyless lock, said communication device with an antenna, said processor, said display device and said battery circuit and having a handle operated by a keyless lock release mechanism to lock and unlock said lock system.

9. The lock system in claim 8 wherein said alphanumerically coded input control is a set of push button pins representing numerals and alphabets controlling a resettable push button keyless lock mechanism for locking and unlocking said keyless lock; and wherein said alphanumerically coded input control is an alphanumerical data code processed by said processor for controlling an electromagnetic keyless lock mechanism for locking and unlocking said keyless lock.

10. The lock system in claim 8 wherein said communication device consists of a cell phone communication receiver operable under wireless cell phone communication protocol standards of G1, G2, G2.5, G3, G3.5, G4, G5 and their compatible conventions to receive said cell phone calls and said dial tones;

whereas said communication device for its intended data communication purposes does not need microphone and speaker thus making its power consumption low, feasible for battery support.

11. The lock system in claim 8 wherein said communication device and said display device are mounted on the front half of said lock system and connected to a rechargeable battery circuit and an energy source such as a solar device mounted on the back half of said lock system to receive solar energy when the lock system is turned over with solar device exposed to the sun;

wherein said solar device is a built-in solar panel electrically connected to said communication device and said display device through said battery circuit and physically mounted on the back surface of said lock system having a surface protector on the edges to prevent being scratched when said lock system is turned facing front to be used while said solar panel facing the back.

12. The lock system in claim 8 wherein said communication device and said display device are mounted on the front half of said lock system and connected to a rechargeable battery circuit and an energy source such as a solar device mounted on the back half of said lock system to receive solar energy when the lock system is turned over with solar device exposed to the sun;

wherein said solar device is an external removable solar panel electrically connected to said communication device and said display device through said battery circuit and physically snapped on the back surface of said lock system having surface protectors on the edges to prevent being scratched when said lock system is turned facing front to be used while said solar panel facing the back.

13. The lock system in claim 8

Wherein said dial tone signal varies depending on the cell phone standards used by said cell phone according to country and according to maker, such as Dual Tone Multi-Frequency (DTMF), Touch Tone, MayField 4 (MF4), Bellcore FSK, secondary dial tone and express dial.

14. The lock system in claim 8

Wherein said lock release mechanism is electronically activated using a solenoid to release a spring according to said alphanumerically coded input control.

15. The lock system in claim 8

Wherein said lock release mechanism is activated by push pins according to said alphanumerically coded input control.

* * * * *